(12) United States Patent
Abotabl et al.

(10) Patent No.: US 11,910,380 B2
(45) Date of Patent: Feb. 20, 2024

(54) UE CAPABILITIES FOR SUPPORTING COMPLEMENTARY BANDWIDTH PART OPERATIONS IN WIRELESS COMMUNICATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/374,742

(22) Filed: Jul. 13, 2021

(65) Prior Publication Data
US 2022/0022222 A1    Jan. 20, 2022

Related U.S. Application Data

(60) Provisional application No. 63/051,822, filed on Jul. 14, 2020.

(51) Int. Cl.
*H04W 72/1268* (2023.01)
*H04W 8/24* (2009.01)
*H04W 72/0446* (2023.01)
*H04W 72/0453* (2023.01)
*H04W 72/566* (2023.01)

(52) U.S. Cl.
CPC ......... *H04W 72/1268* (2013.01); *H04W 8/24* (2013.01); *H04W 72/0446* (2013.01); *H04W 72/0453* (2013.01); *H04W 72/569* (2023.01)

(58) Field of Classification Search
CPC .......... H04W 72/1268; H04W 72/569; H04W 72/0446; H04W 72/0453; H04W 8/24
USPC ........................................................ 370/329
See application file for complete search history.

(56) References Cited

U.S. PATENT DOCUMENTS

| 2019/0082425 A1* | 3/2019 | Li | H04L 5/0053 |
| 2019/0104543 A1* | 4/2019 | Park | H04W 74/006 |
| 2019/0357262 A1* | 11/2019 | Cirik | H04W 76/27 |
| 2021/0119745 A1* | 4/2021 | Li | H04L 5/0042 |

FOREIGN PATENT DOCUMENTS

WO    WO-2019098906 A1 *  5/2019  ........ H04W 74/0833

* cited by examiner

*Primary Examiner* — Intekhaab A Siddiquee
(74) *Attorney, Agent, or Firm* — QUALCOMM Incorporated

(57) ABSTRACT

Aspects of the present disclosure provide techniques for wireless communication using a user equipment (UE) capability indication to support complementary bandwidth part (BWP) operations. In one aspect, a UE can transmit UE capability information to indicate the ability of the UE to support complementary BWP operations, and the network can configure complementary BWP operations based on the UE capability.

26 Claims, 14 Drawing Sheets

UE CAPABILITIES FOR SUPPORTING COMPLEMENTARY BANDWIDTH PART OPERATIONS IN WIRELESS COMMUNICATION

PRIORITY CLAIM

This application claims priority to and the benefit of provisional patent application No. 63/051,822 filed in the United States Patent Office on Jul. 14, 2020, the entire content of which is incorporated herein by reference as if fully set forth below in its entirety and for all applicable purposes.

TECHNICAL FIELD

The technology discussed below relates generally to wireless communication systems, and more particularly, to wireless communication using UE capability to support complementary bandwidth part (BWP) operations.

INTRODUCTION

In a wireless communication network, for example, a fifth generation (5G) New Radio (NR) network, a base station may communicate with one or more user equipment (UE) or wireless devices using full duplex (FD) and/or half duplex (HD) communication. In this disclosure, full duplex means a wireless device can simultaneously communicate with another wireless device in both communication directions (e.g., transmitting and receiving directions). Half duplex means a wireless device can only communicate with another wireless device in one communication direction (e.g., transmitting or receiving direction) at a time.

Two exemplary FD modes are in-band full duplex (IBFD) and sub-band full duplex (SBFD). In IBFD communication, a wireless device can transmit and receive information using the same time and frequency resources. In IBFD communication, downlink (DL) and uplink (UL) communication can share the same time/frequency resources. In this case, the DL and UL time/frequency resources can fully or partially overlap. In SBFD communication, a wireless device can transmit and receive at the same time using different frequency resources. In this case, DL communication resources are separated from UL communication resources in the frequency domain. In some examples, the DL and UL communication resources may be separated by a guard band.

In 5G NR, the network may allocate up to four bandwidth parts to UL communication and up to four bandwidth parts to DL communication. A bandwidth part (BWP) is a contiguous set of physical resource blocks (PRBs) on a given carrier. These PRBs can be selected from a contiguous subset of common resource blocks for a given numerology. During wireless communication, a wireless device may need to switch UL and/or DL BWPs due to the differences between HD and FD slots/formats. However, BWP switching can be a time-consuming process.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a communication interface configured to communicate with a scheduling entity, a memory, and a processor operatively coupled with the communication interface and the memory. The processor and the memory are configured to receive a UE capability enquiry message from the scheduling entity. The processor and the memory are further configured to transmit a UE capability information message to the scheduling entity, in response to the UE capability enquiry message. The UE capability information message includes bandwidth part (BWP) information of the UE. The processor and the memory are further configured to communicate with the scheduling entity using an anchor BWP and a complementary BWP based on the BWP information. A first switching time between the anchor BWP and the complementary BWP is shorter than a second switching time between the anchor BWP and a non-complementary BWP.

Another aspect of the disclosure provides a method of wireless communication at a user equipment (UE). The UE receives a UE capability enquiry message from a scheduling entity. The UE transmits, to the scheduling entity, a UE capability information message in response to the UE capability enquiry message. The UE capability information message includes bandwidth part (BWP) information of the UE. The UE communicates with the scheduling entity using an anchor BWP and a complementary BWP based on the BWP information. A first switching time between the anchor BWP and the complementary BWP is shorter than a second switching time between the anchor BWP and a non-complementary BWP.

Another aspect of the disclosure provides a scheduling entity for wireless communication. The scheduling entity includes a transceiver configured to communicate with a user equipment (UE), a memory, and a processor operatively coupled with the transceiver and the memory. The processor and the memory are configured to transmit, to the UE, a UE capability enquiry message. The processor and the memory are further configured to receive a UE capability information message from the UE. The UE capability information message includes bandwidth part (BWP) information that indicates a capability of the UE to utilize an anchor BWP and a complementary BWP to communicate with the scheduling entity. A first switching time between the anchor BWP and the complementary BWP is shorter than a second switching time between the anchor BWP and a non-complementary BWP. The processor and the memory are further configured to communicate with the UE using the anchor BWP and the complementary BWP based on the BWP information.

Another aspect of the disclosure provides a method of wireless communication at a scheduling entity. The scheduling entity transmits a UE capability enquiry message to a user equipment (UE). The scheduling entity further receives a UE capability information message from the UE. The UE capability information message includes bandwidth part (BWP) information that indicates a capability of the UE to utilize an anchor BWP and a complementary BWP to communicate with the scheduling entity. A first switching time between the anchor BWP and the complementary BWP is shorter than a second switching time between the anchor BWP and a non-complementary BWP. The scheduling entity communicates with the UE using the anchor BWP and the complementary BWP based on the BWP information.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various implementations discussed herein. In similar fashion, while exemplary implementations may be discussed below as device, system, or method examples, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide methods and apparatuses for wireless communication using UE capability indication to support complementary bandwidth part (BWP) in full duplex operations. In one aspect, a user equipment (UE) can transmit UE capability information to indicate its ability to support complementary BWP in full duplex operations, and the network can configure complementary BWP operations based on the UE capability.

Figure 1:
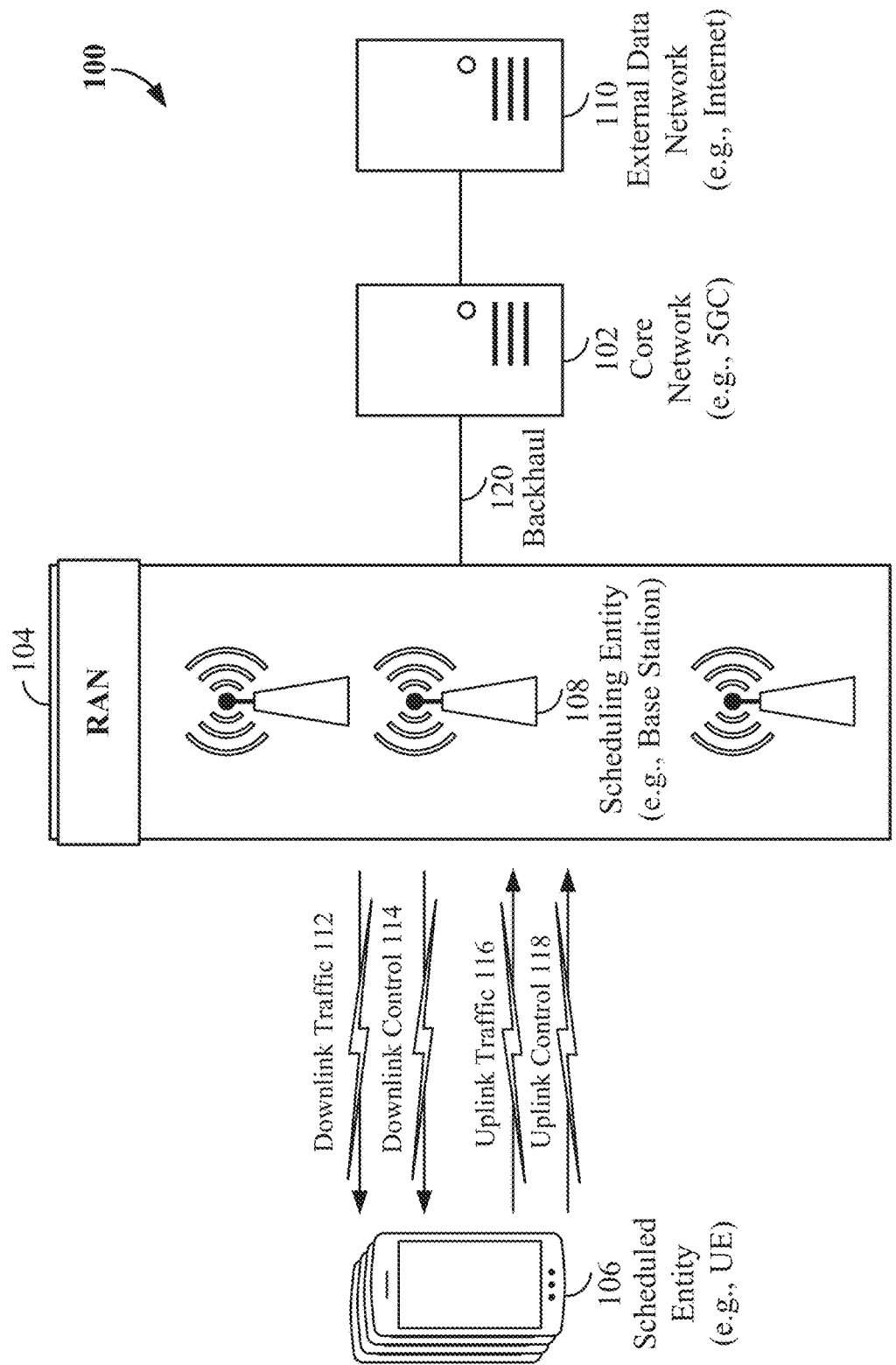
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
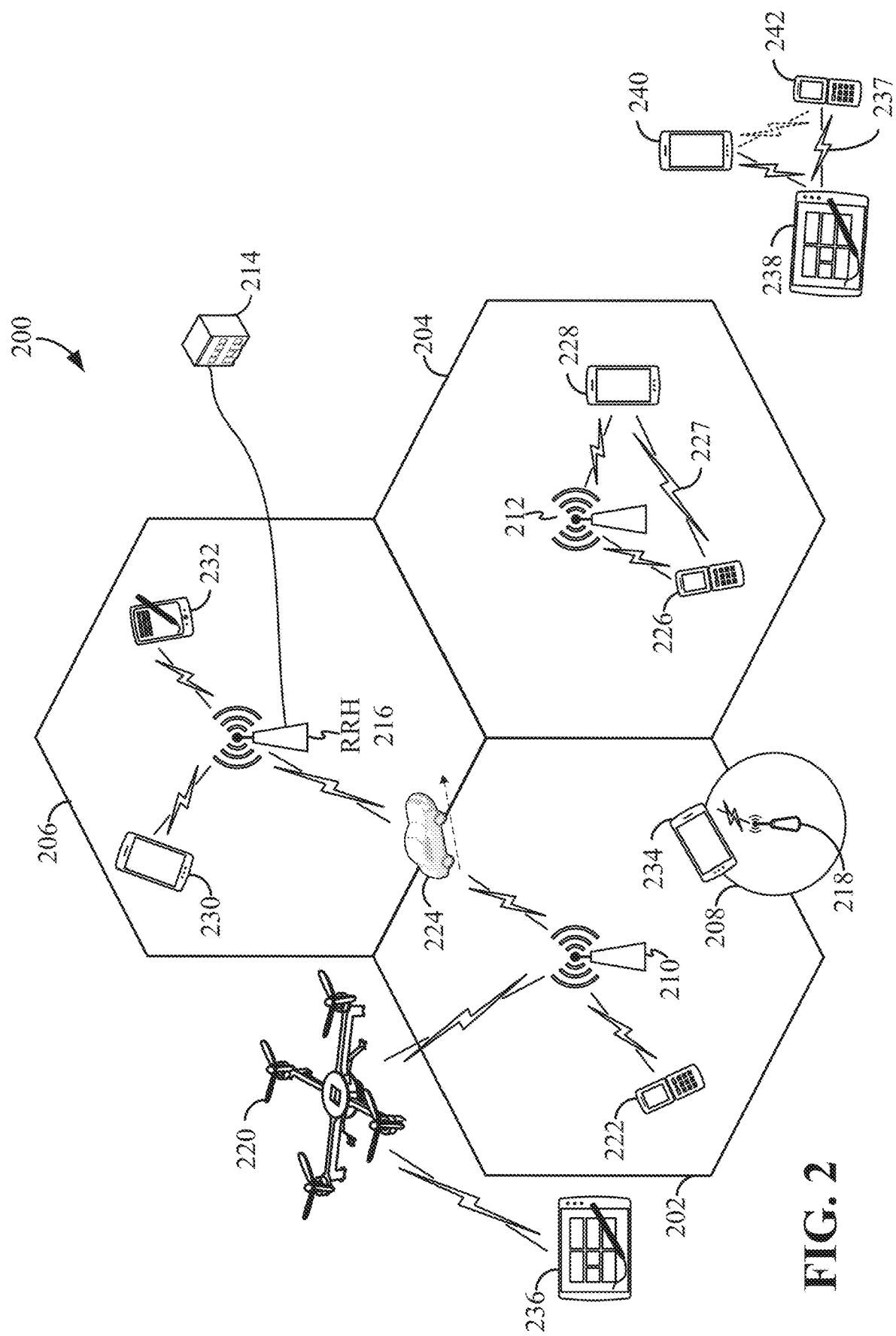
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints (e.g., base station and UE) can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum) or BWPs. In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G New Radio (NR) specifications, user data may be coded in various manners. Some data can be coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching. Aspects of the present disclosure may be implemented utilizing any suitable channel coding techniques. Various implementations of scheduling entities 108 and scheduled entities 106 may include suitable hardware and capabilities (e.g., an encoder, a decoder, and/or a CODEC) to utilize one or more of these channel codes for wireless communication.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
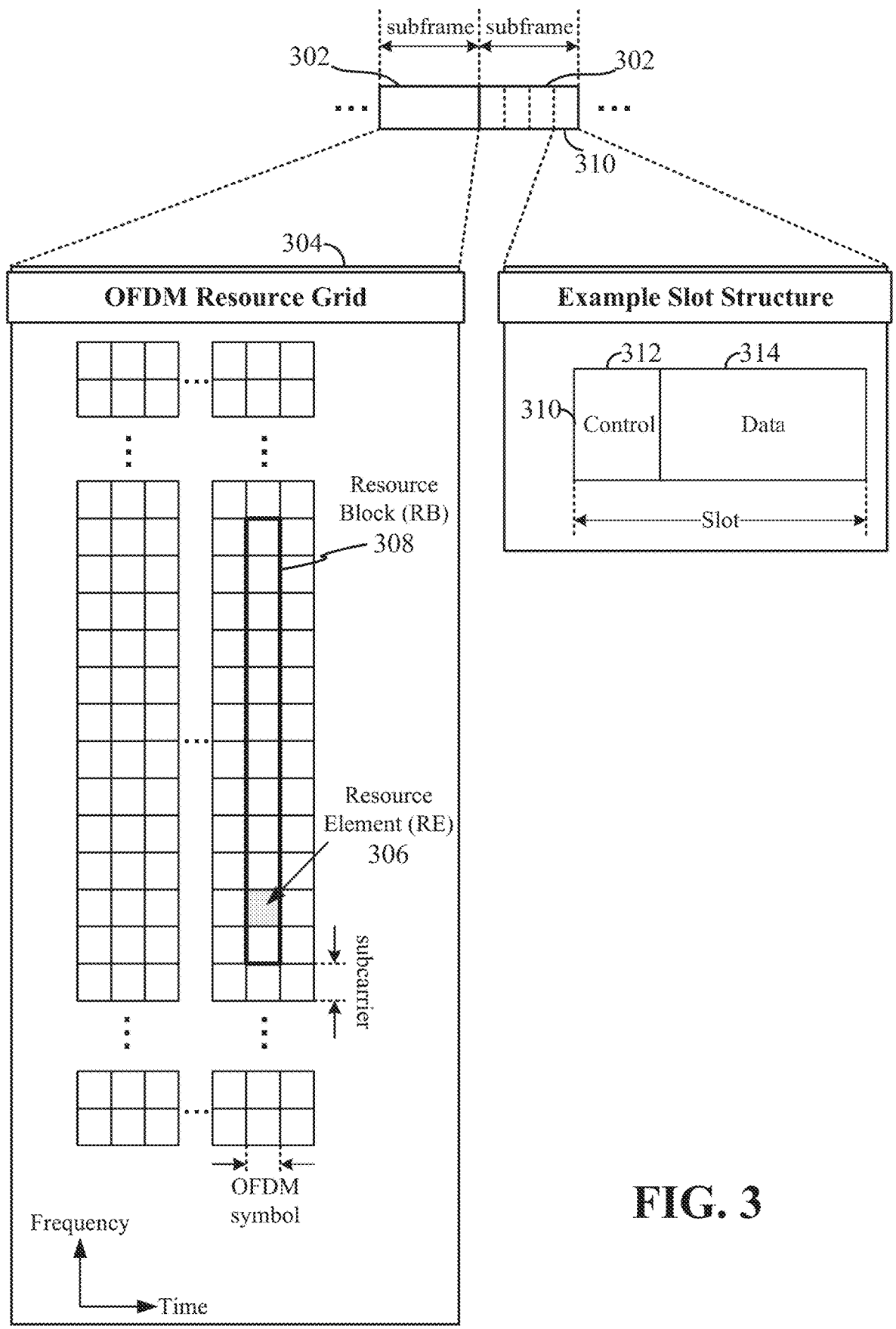
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple numbers of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
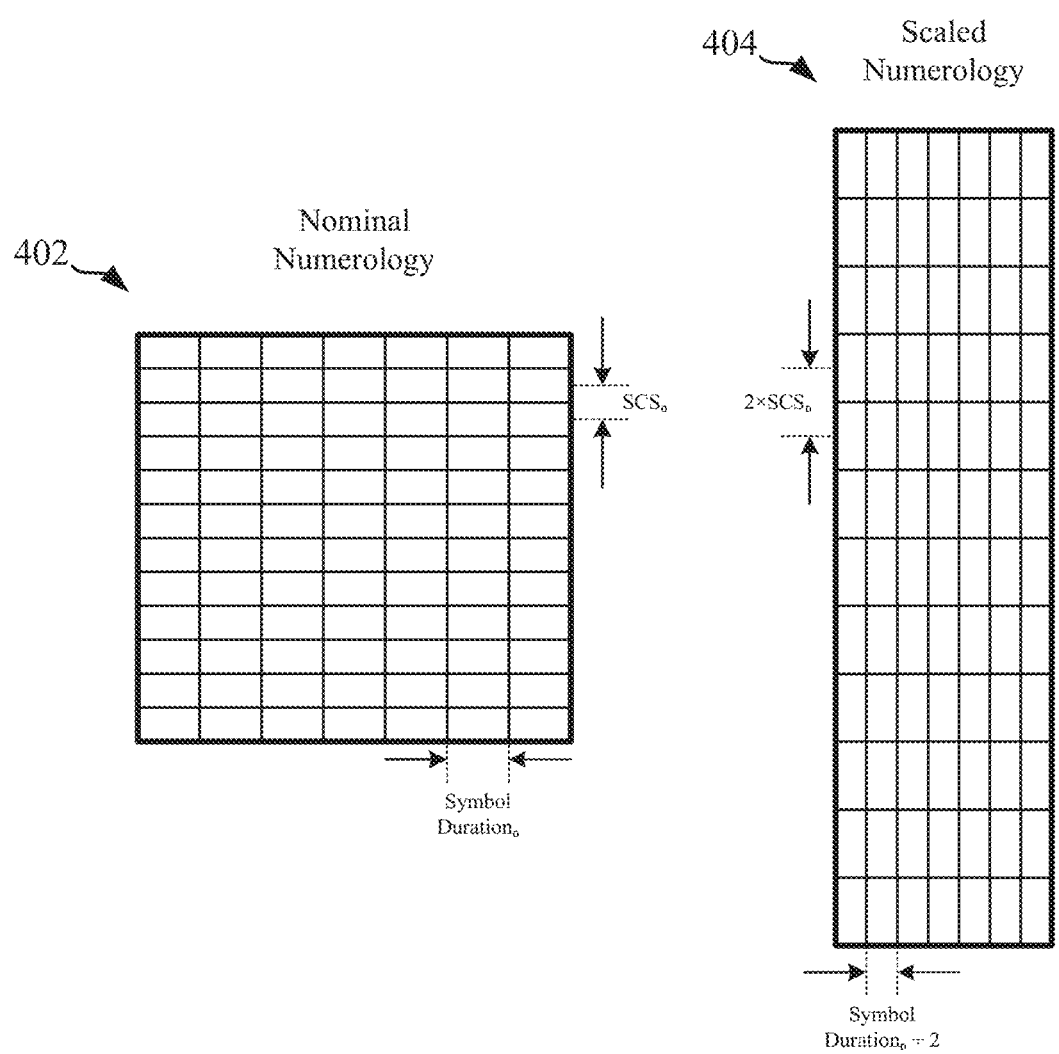
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 μs. Here, in the second RB 404, the scaled numerology includes a scaled SCS of double the nominal SCS, or $2\times SCS_n=60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 μs.

A scheduling entity (e.g., gNB) can allocate RBs (e.g., RBs 308, 402, and 404) in units of bandwidth part (BWP) to a UE for UL and DL communication. A bandwidth part (BWP) is a contiguous set of physical resources (e.g., RBs 308) on a given frequency carrier. These RBs are selected from a contiguous subset of common resource blocks for a given numerology. A UE can be configured with up to 4 DL BWPs and up to 4 UL BWPs. Only one BWP is active at a time for DL, and only one BWP is active at a time for UL. A BWP configuration can include various parameters, for example, numerology, bandwidth size, frequency location, search space, SCS, etc. In general, a UE receives and transmits only within the frequency range of the active BWP. A UE may switch between BWPs, for example, between FD and HD slots. However, switching between BWPs can be time consuming and can increase latency. In some aspects, BWP switching can be controlled using DCI, timer control, radio resource control (RRC) signaling, and/or MAC CE (Control Element) signaling. In one example, a scheduling entity may transmit DCI, including a BWP indicator to activate a specific BWP. In one example, the activation or deactivation of a DL BWP can be controlled by a timer (e.g., bwp-inactivityTimer). For example, if a UE is not scheduled with a BWP for a certain amount of time, i.e., expiration of a timer, the UE may switch to the default BWP. For example, during the initial access (e.g., RACH procedure), the UE can use the default BWP as the active BWP until the UE is configured with other BWPs during or after RRC connection establishment.

In TDD communication, the DL and UL BWP may switch simultaneously or at different times. In some examples, a switch in DL BWP can lead to a change in UL BWP. In FDD communication, the DL and UL BWP can switch independently. During a random access channel (RACH) procedure, the UE may need to perform BWP switching if the physical random access channel (PRACH) occasions are not configured for the current active UL BWP. In this case, the UE's MAC entity can switch the active UL BWP to the initial or default UL BWP for the RACH procedure. If PRACH occasions are configured for the active UL BWP, the UE does not need to switch the active UL BWP. For DL, BWP switching may occur if the serving cell is a SpCell (a primary cell of a secondary cell group) and if the BWP ID of the active DL BWP is different from the BWP ID of the active UL BWP. In communication using both FD and HD, the UE may need to switch the active BWP frequently due to differences between the HD slots and FD slots that have different formats.

Figure 5:
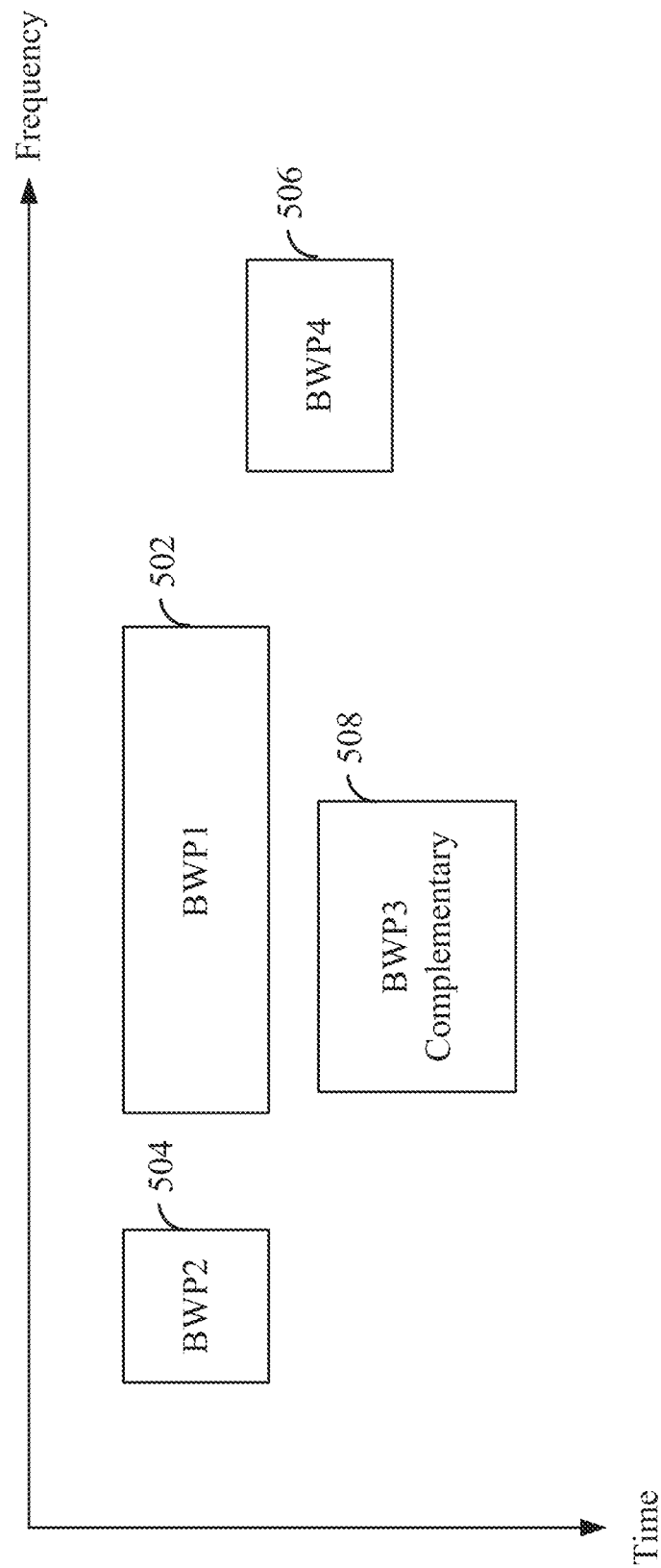
FIG. 5 is a schematic illustration of exemplary bandwidth parts according to some aspects of the disclosure.

FIG. 5 is a schematic illustration of some exemplary BWPs according to some aspects of the disclosure. FIG. 5 illustrates the time-frequency resource allocations of four exemplary BWPs that can be configured by a network or scheduling entity (e.g., gNB). A UE may be configured with an active BWP among the BWPs for UL or DL communication. In addition, a UE may be configured with a complementary BWP, and the active BWP is considered as the anchor BWP. For example, the UE can be configured with BWP1, BWP2, or BWP4 as the anchor BWP 502, 504, or 506, and BWP3 as a complementary BWP 508. The UE has the ability to switch between an anchor BWP and a complementary BWP significantly faster than between BWPs that are not complementary. Whether or not a BWP is complementary is UE specific because it is based on the UE's ability to quickly switch to and from a complementary BWP. Assuming that the UE can switch between non-complementary BWPs in x milliseconds (ms), the UE can switch between an anchor BWP and a complementary BWP in less than x ms. The operations that can be configured using the complementary BWP depend on the BWP switching time. For example, a faster BWP switching time can facilitate the use of low latency traffic in the complementary BWP. In another example, a faster switching time can enable FD and HD communication using the anchor BWP and complementary BWP for different FD and HD slot formats (e.g., different frequency and/or bandwidths). For example, the anchor BWP (e.g., BWP 502, 504, or 506) can have a wider bandwidth than the complementary BWP 508 using different frequencies.

Figure 6:
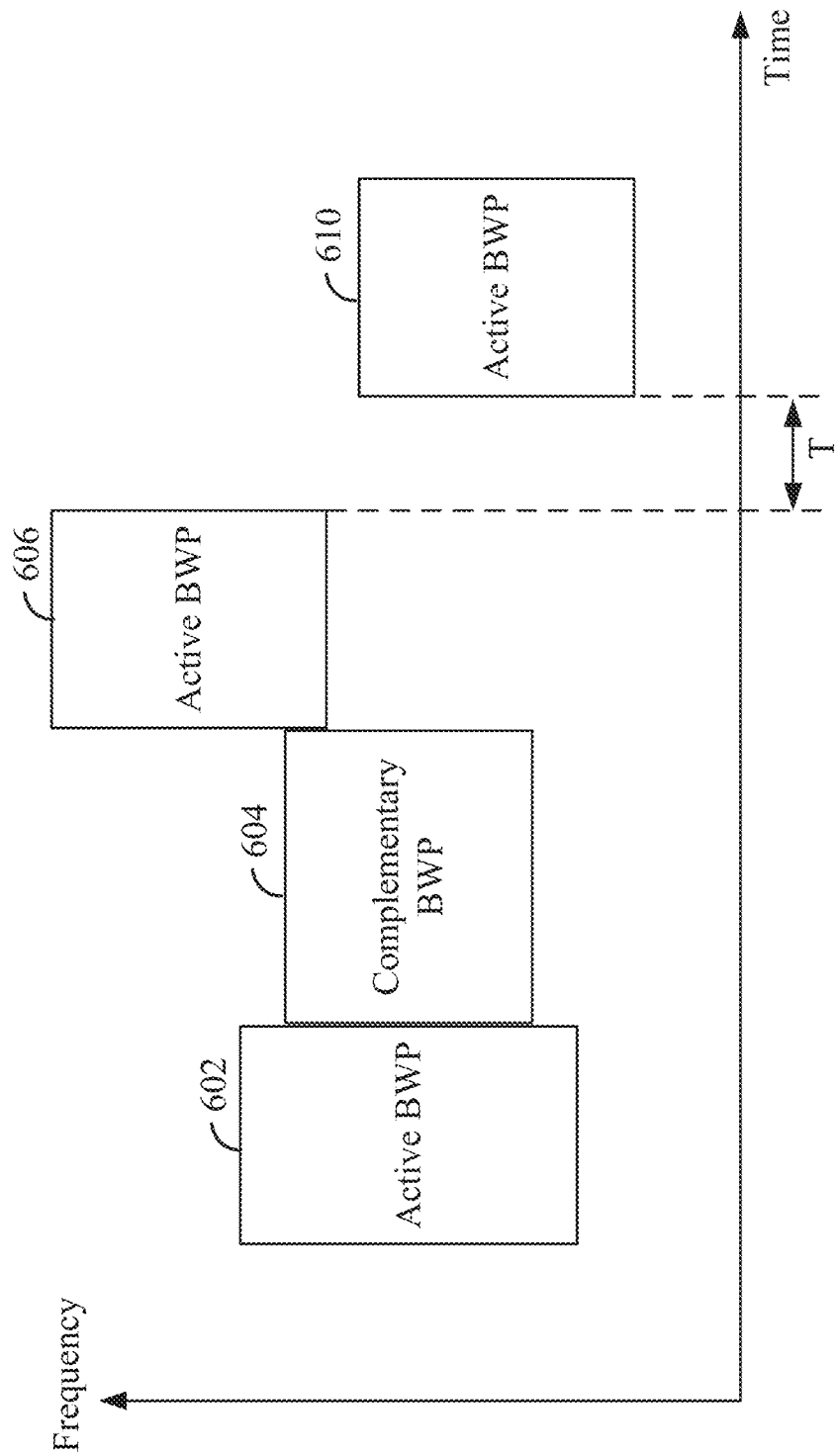
FIG. 6 is a schematic illustration switching between an anchor bandwidth part (BWP) and a complementary BWP in wireless communication according to some aspects of the disclosure.

FIG. 6 is a drawing illustrating switching operations between an anchor BWP and a complementary BWP in wireless communication according to some aspects of the disclosure. The UE can use various explicit and/or implicit control methods to switch between BWPs. For example, BWP switching can be configured using DCI, RRC reconfiguration, timer expiration, MAC CE, and/or implicit switching. In some aspects, switching between an anchor (active) BWP 602 and a complementary BWP 604 can be implicit based on slot format and/or priority. With implicit switching, the scheduling entity or base station does not need to expressly indicate the BWP (e.g., active BWP or complementary BWP) to the UE. For example, the UE can be configured to use different slot formats for FD and HD communications, respectively. Therefore, the UE can switch between the anchor BWP 602 for a first slot format (e.g., FD/HD slot) and the complementary BWP 604 for a second slot format (e.g., HD/FD slot). In another implicit switching example, the UE may use the anchor BWP 602 for low priority traffic (e.g., latency tolerant traffic) and the complementary BWP 604 for high priority traffic (e.g., low latency traffic), or vice versa.

In some aspects, the UE can switch between the anchor (active) BWP 602 and the complementary BWP 604 within a predetermined time duration that is shorter than a time duration T to switch between non-complementary BWPs (e.g., between active BWP 606 and active BWP 608). In some aspects, the switching delay can depend on the UE procedures performed to reconfigure the UE including hardware and/or software to use the new BWP to communicate with the network (e.g., scheduling entity 108). For example, the UE may need to perform an RF tuning procedure to switch to a different BWP. In some aspects, the network (e.g., scheduling entity 108) may transmit an RRC message to the UE to configure the complementary BWP according to a BWP configuration included in the RRC message. In one example, the BWP configuration may have a bit that indicates whether or not the BWP is a complementary BWP. In one example, the BWP configuration of an anchor BWP may include a BWP index that indicates the complementary BWP.

The complementary BWP configuration may or may not depend on the anchor BWP based on the UE's capability to switch between the BWPs. Dependence between BWPs means the configuration of the complementary BWP can be limited or controlled by the configuration of the anchor BWP. In one aspect, the complementary BWP may depend on one or more parameters (e.g., bandwidth, SCS, carrier location, etc.) of the anchor BWP. For example, the complementary BWP and anchor BWP can share a common bandwidth such that the UE may reduce RF tuning occasions during BWP switching. For example, if the UE is capable of communicating with the network using a bandwidth that encompasses both the complementary BWP and anchor BWP, the UE does not need to perform RF tuning when switching between the complementary and anchor BWPs. Because the BWP switching delay comes from UE procedures such as RF tuning, having a common bandwidth between the anchor and complementary BWPs can help in reducing BWP switching time in this example.

When a complementary BWP is independent from the anchor BWP based on UE capability, the UE is able to switch between the complementary BWP and the anchor BWP significantly faster than switching between non-complementary BWPs. In this case, the UE may be configured with the hardware and/or software needed to switch between an independent complementary BWP and the anchor BWP at any moment without introducing a long delay. In one example, the UE may be capable of communicating using either the anchor or the independent complementary BWP without reconfiguring or RF tuning.

In one aspect, the complementary BWP can be configured with an SCS that is different from the anchor BWP. For example, the complementary BWP can have a larger SCS and shorter slot timing that provides lower transmission latency for ultra-reliable low-latency communication (URLLC).

In one aspect, the anchor BWP and the complementary BWP can be configured to be used for different slot types or formats, for example, FD slot, HD slot, UL slot, and DL slot. In one aspect, the anchor BWP and the complementary BWP can be configured for different traffic priorities. For example, the BWP with a larger SCS can be used for low latency traffic (e.g., URLLC), and the BWP with a smaller SCS can be used for latency tolerant traffic.

Figure 7:
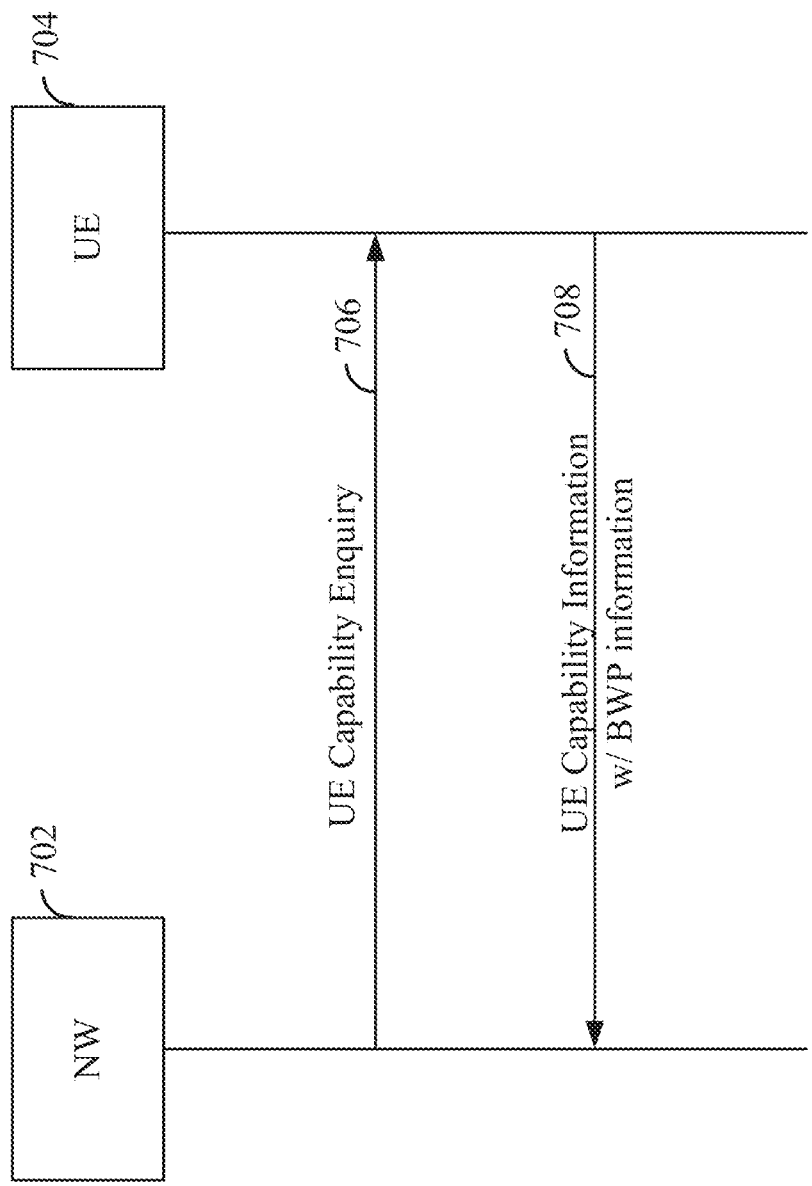
FIG. 7 is a schematic illustration of UE capability communication between a network and a user equipment (UE) according to some aspects of the disclosure.

FIG. 7 is a diagram illustrating UE capability communication between a network 702 and a UE 704 with complementary BWP capability according to some aspects of the disclosure. To support complementary BWP, the UE can indicate to a network its ability to configure and use a complementary BWP for communication with the network. For example, the network 702 (e.g., a base station or scheduling entity 108) may transmit a UE capability enquiry message 706 to the UE 704. In one aspect, the scheduling entity can transmit the UE capability enquiry message 706 using semi-persistent signaling (SPS), for example, radio resource control (RRC) signaling (e.g., a UECapabilityEnquiry RRC message). The UE capability enquiry message 706 may specify the UE-specific capability information requested by the network.

In response to the UE capability enquiry message 706, the UE may report the requested information. For example, the UE 704 may transmit a UE capability information message 708 (e.g., UECapabilityInformation) to the network 702. The UE capability information message 708 may be transmitted using semi-persistent signaling, for example, an RRC information element (IE) or control message.

The UE capability information message 708 can include specific UE capability information. For example, the UE capability information message can indicate the carriers and carrier combinations supported by the UE. In some aspects of the disclosure, the UE capability information message 708 can indicate the UE's capability to use one or more complementary BWPs in wireless communication. In one aspect, the UE capability information message 708 may indicate that the UE does not support any complementary BWP. In one aspect, the UE capability information message 708 may indicate that the UE can support a complementary BWP configuration with certain constraints. Some examples of the constraints may be bandwidth constraints, frequency allocation constraints, network configuration constraints, and other configuration constraints (e.g., PDCCH, PDSCH, semi-persistent scheduling, SCS, etc.). In one aspect, the UE capability information 708 may indicate that the UE can support a complementary BWP configuration without constraints. In this case, the UE can be configured with a complementary BWP that is independent of an anchor BWP.

Figure 8:
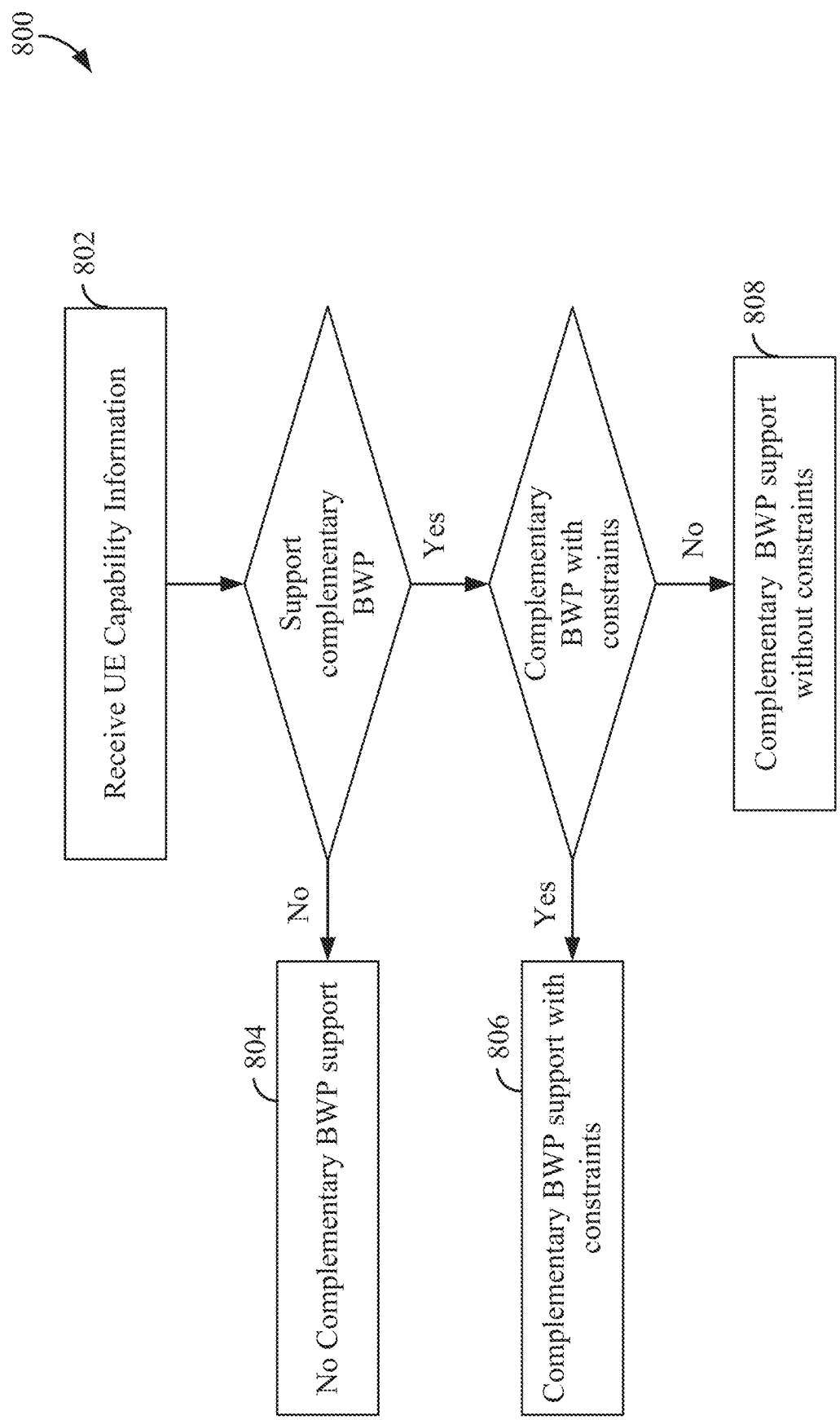
FIG. 8 is a flow chart illustrating an exemplary process for determining a complementary BWP capability of a UE according to some aspects of the disclosure.

FIG. 8 is a flow chart illustrating an exemplary process 800 for determining a complementary BWP capability of a UE according to some aspects. At block 802, a scheduling entity 108 (e.g., a base station or gNB) can receive UE capability information 708 from a UE. For example, the UE capability information may include information on complementary BWP support of the UE. At block 804, the scheduling entity can determine that the UE does not support a complementary BWP. At block 806, the scheduling entity can determine that the UE can support a complementary BWP with certain constraints. Some examples of the constraints may be bandwidth constraints, frequency allocation constraints, network configuration constraints, and other configuration constraints (e.g., PDCCH, PDSCH, semi-persistent scheduling, SCS, etc.). In this case, the scheduling entity can configure the UE to use a complementary BWP that depends on an anchor BWP. At block 808, the scheduling entity can determine that the UE can support a complementary BWP without any constraints. In this case, the scheduling entity can configure the UE to use a complementary BWP that is independent of an anchor BWP.

Figure 9:
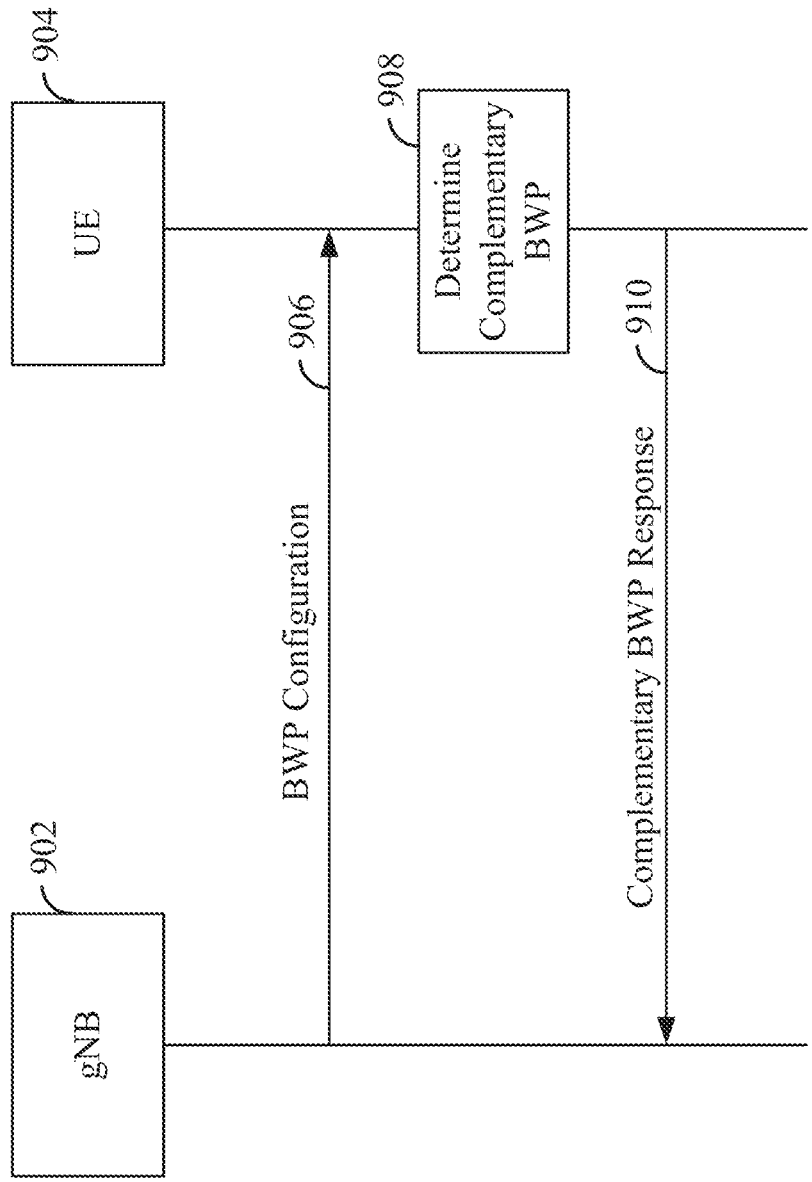
FIG. 9 is a schematic illustration of BWP configuration communication between a scheduling entity and a UE according to some aspects of the disclosure.

FIG. 9 is a diagram illustrating BWP configuration communication between a scheduling entity 902 and a UE 904 according to some aspects of the disclosure. The scheduling entity 902 may be any of the base stations and scheduling entities described in FIGS. 1 and 2. The UE 904 may be any of the UEs and scheduled entities described in FIGS. 1 and 2. In one aspect, the scheduling entity 902 can configure the UE 904 to use a complementary BWP when the UE capability information (e.g., UE capability information 708) indicates that the UE can support a complementary BWP with constraints. For example, the scheduling entity 902 can transmit a BWP configuration message 906 to the UE 904 to configure one or more BWPs including a complementary BWP. For example, the BWP configuration message 906 may indicate one or more BWPs that are preconfigured or supported at the UE. In one aspect, the BWP configuration message 906 may be included in an RRC message or system information transmission. In one aspect, the BWP configuration message 906 may be included in a MAC CE.

At block 908, the UE can determine the complementary BWP configured by the BWP configuration 906. If the configured complementary BWP does not satisfy the UE's capability or constraints with respect to complementary BWP operation, the UE may signal (e.g., complementary BWP response 910) to the scheduling entity that no complementary BWP is configured at the UE. In some aspects, the UE may signal the scheduling entity using UCI, RRC signaling, and/or MAC CE. Alternatively, the UE may search its configured BWP(s) to look for a complementary BWP that can satisfy the UE's capability/constraints with respect to complementary BWP operation.

Figure 10:
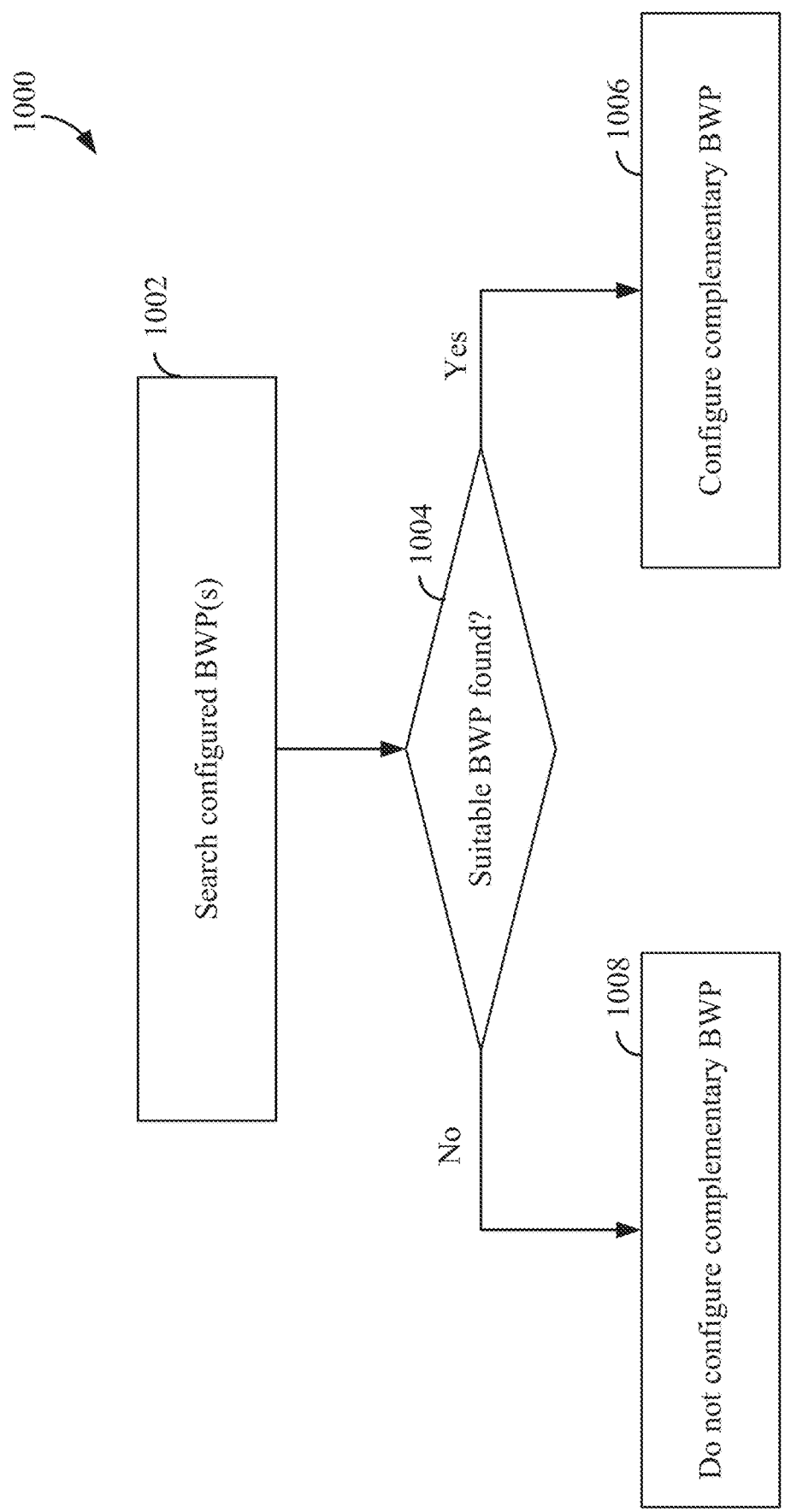
FIG. 10 is a flow chart illustrating an exemplary process for searching a complementary BWP according to some aspects of the disclosure.

FIG. 10 is a flow chart illustrating an exemplary process 1000 for searching for a complementary BWP according to some aspects. At block 1002, the UE searches for a configured BWP (e.g., BWP1, BWP2, BWP3, and BWP4 of FIG. 5). For example, a scheduling entity may configure the BWPs in a BWP configuration 906 described above in FIG. 9. At decision block 1004, the UE determines whether or not one or more configured BWPs can be a suitable complementary BWP that satisfies the UE's capability/constraints for complementary BWP operation with an active/anchor BWP. Some examples of the capability/constraints may be bandwidth constraints, frequency allocation constraints, network configuration constraints, and other configuration constraints (e.g., PDCCH, PDSCH, semi-persistent scheduling, SCS, etc.). If the UE found a suitable configured BWP, at block 1006, the UE selects the BWP as a complementary BWP. If the UE found multiple (2 or more) BWPs that can satisfy the UE's capability/constraints for complementary BWP operations, the UE can select one of the BWPs as the complementary BWP using a predetermined method or rule. In one example, the UE may select the BWP with a smaller BWP ID to be the complementary BWP when multiple BWPs can be used as a complementary BWP. At block 1008, if the UE found no suitable BWP, the UE configures no complementary BWP. Then, the UE may signal (e.g., complementary BWP response 910) the result back to the scheduling entity whether or not a complementary BWP is configured.

In some aspects, a UE (e.g., UE 106) can support a complementary BWP without any constraints. In one aspect, if the network has not configured the UE to use a complementary BWP, the UE can forego or skip using a complementary BWP for communication with the network (e.g., scheduling entity 108). In another aspect, if the network has not configured the UE to use a complementary BWP, the UE can choose a complementary BWP among its configured BWPs based on a predetermined rule. In one example, the UE may choose a complementary BWP with the smallest BWP ID among the configured BWPs. In another example, the UE may choose a complementary BWP with a smaller bandwidth among the configured BWPs. In another example, the UE can choose a complementary BWP that meets certain criteria with respect to UE operations. For example, the criteria may include power-saving and UE processing load when the UE is configured with a certain BWP (e.g., anchor BWP). The UE may select a complementary BWP with lower power consumption and/or UE processing load. A complementary BWP that can result in lower power consumption and/or UE processing load is preferred over other configured BWP(s). In one aspect, the UE may consider the bandwidths and/or frequency allocation of the configured BWPs to determine the power consumption and/or UE processing load. In general, using a BWP with a larger bandwidth can increase power consumption and/or UE processing load. Once the UE has selected the complementary BWP, the UE can inform (e.g., complementary BWP response 910) the scheduling entity using UCI, RRC signaling, and/or MAC CE.

Figure 11:
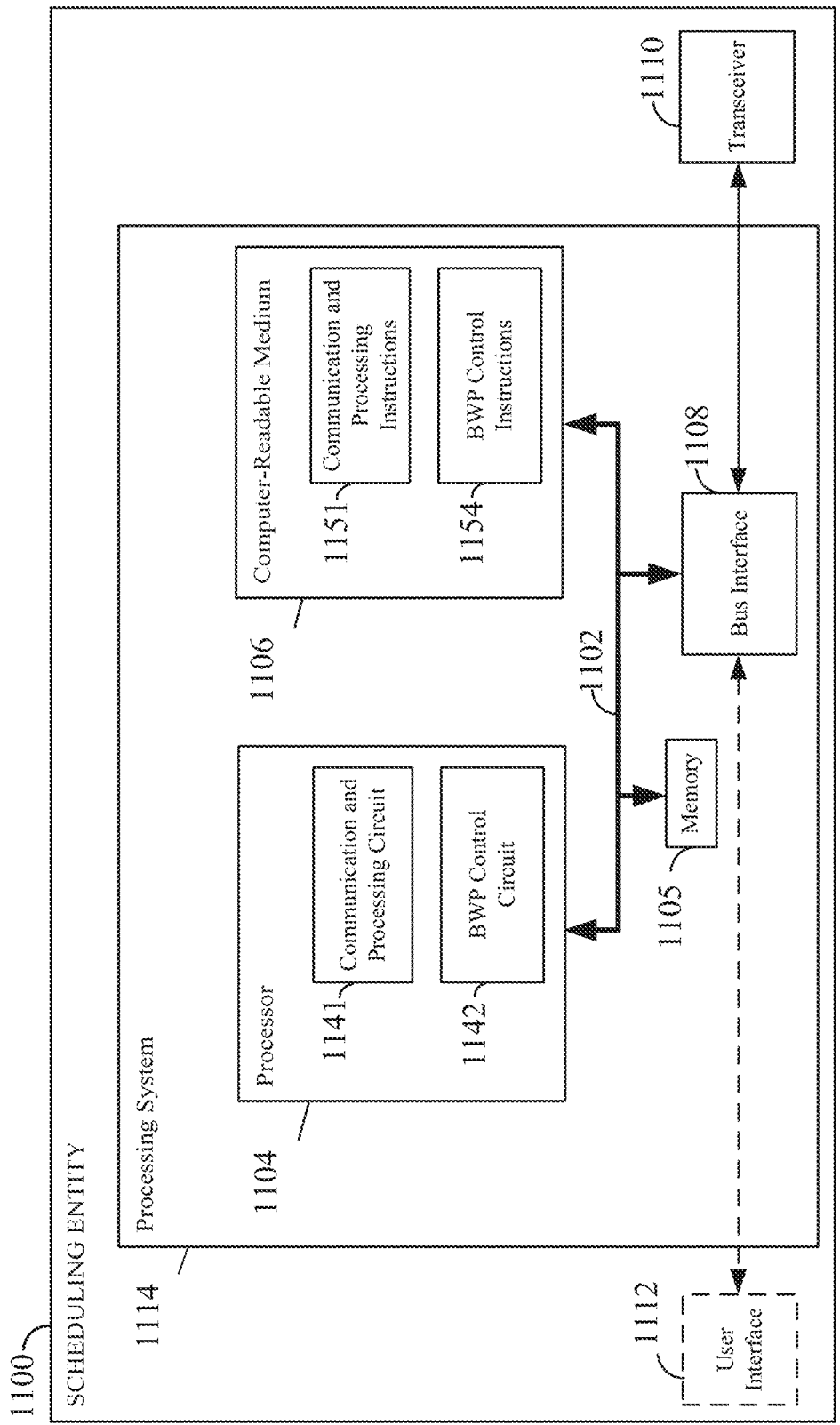
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 1114. For example, the scheduling entity 1100 may be a base station or gNB as illustrated in any one or more of FIGS. 1, 2, 7, and/9.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described below and illustrated in FIG. 9.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions, including, for example, wireless communication using an active BWP and a complementary BWP. For example, the circuitry may be configured to implement one or more of the functions described in relation to FIG. 12.

In some aspects of the disclosure, the processor 1104 may include communication and processing circuitry 1141 configured for various functions, including for example communicating with a network core (e.g., a 5G core network), scheduled entities (e.g., UE), or any other entity, such as, for example, local infrastructure or an entity communicating with the scheduling entity 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1141 may include one or more transmit/receive chains. In addition, the communication and processing circuitry 1141 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1141 may further be configured to execute communication and processing software 1151 stored on the computer-readable medium 1106 to implement one or more functions described herein.

In some implementations where the communication involves receiving information, the communication and processing circuitry 1140 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuit 1141 may receive one or more of signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for processing, including a means for demodulating, a means for decoding, etc.

In some implementations where the communication involves sending (e.g., transmitting) information, the communication and processing circuitry 1141 may obtain information (e.g., from another component of the processor 1104, the memory 1105, or the bus interface 1108), process (e.g., modulate, encode, etc.) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for generating, including a means for modulating, a means for encoding, etc.

In one aspect, the processor 1104 may include a BWP control circuit 1142 that can be configured to perform various functions for configuring and controlling BWP operations in wireless communication with a UE. For example, the BWP control circuit 1142 can schedule and configure an anchor BWP and a complementary BWP for UL and DL communication based on UE capability information that indicates UE support of complementary BWPs. In some examples, the BWP control circuitry 1142 may transmit a UE capability enquiry to the UE to request UE capability information on complementary BWP support. Based on the UE capability, the BWP control circuitry 1142 can configure the UE to use a complementary BWP, if available, to communicate with the scheduling entity. The BWP control circuitry 1142 may further be configured to execute BWP control software 1154 stored on the computer-readable medium 1106 to implement one or more functions described herein.

Figure 12:
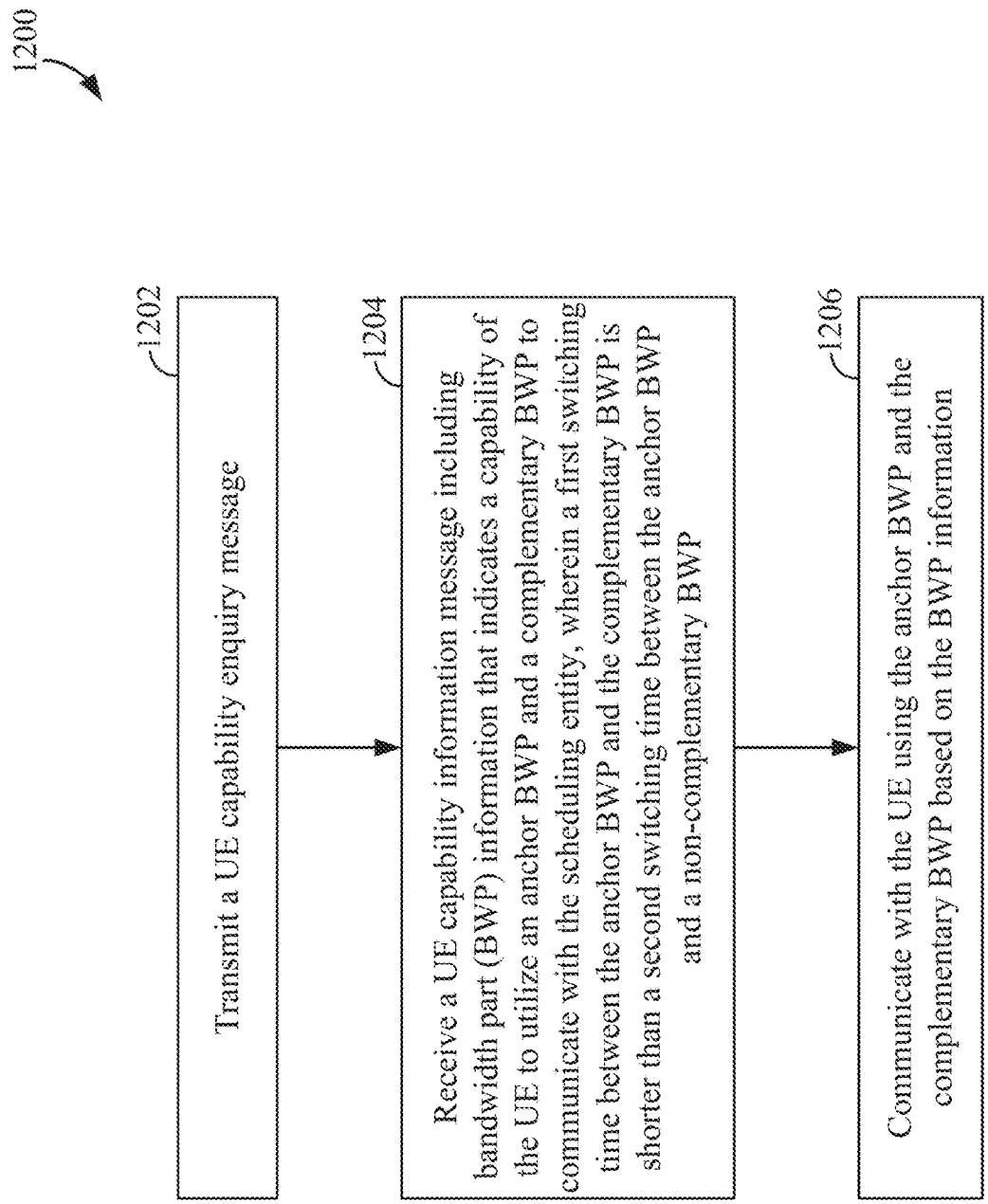
FIG. 12 is a flow chart illustrating an exemplary process for wireless communication at a scheduling entity using UE capability information with complementary BWP support in accordance with some aspects of the present disclosure.

FIG. 12 is a flow chart illustrating an exemplary process 1200 for wireless communication at a scheduling entity using UE capability information with complementary bandwidth part (BWP) support in accordance with some aspects of the present disclosure. As described below, some or all illustrated features may be omitted in a particular implementation within the scope of the present disclosure, and some illustrated features may not be required for all implementations. In some examples, the process 1200 may be carried out by the scheduling entity 1100 illustrated in FIG. 11. In some examples, the process 1200 may be carried out by any suitable apparatus (e.g., gNB or base station) or means for carrying out the functions or algorithm described below.

At block 1202, a scheduling entity can transmit a UE capability enquiry message to a UE. In one aspect, the communication and processing circuit 1141 may provide a means to transmit the UE capability enquiry message 706 via the transceiver 1110. In one example, the UE capability enquiry message may be an RRC control message or the like. The UE capability enquiry message may specify or request the information that the scheduling entity wants to get from the UE. For example, the UE capability enquiry message may request BWP information from the UE. For example, the BWP information may include complementary BWP support information that indicates whether or not the UE can communicate with the scheduling entity using one or more complementary BWPs.

At block 1204, the scheduling entity can receive a UE capability information message from the UE. The UE capability information message may include BWP information that indicates the capability of the UE to utilize one or more BWPs (e.g., an anchor BWP and a complementary BWP) to communicate with the scheduling entity. In some aspects, a first switching time between the anchor BWP and the complementary BWP is shorter than a second switching time between the anchor BWP and a non-complementary BWP. In one aspect, the communication and processing circuit 1141 may provide a means to receive the UE capability information message via the transceiver 1110. In one example, the UE capability information message may be an RRC message (e.g., UE capability information message 708).

At block 1206, the scheduling entity can communicate with the UE using the anchor BWP and the complementary BWP based on the BWP information included in the UE capability information. In one aspect, the communication and processing circuit 1141 may provide a means to communicate (e.g., transmit and/or receive information) with the UE using the anchor BWP and the complementary BWP. The scheduling entity may communicate with the UE with or without using the complementary BWP. In one aspect, the BWP control circuit 1142 may provide a means for controlling and configuring the UE to use the complementary BWP that is supported by the UE according to the UE capability information. In some examples, the UE can switch between the anchor BWP and the complementary BWP faster than between an anchor BWP and a non-complementary BWP. For example, the use of complementary BWP can be helpful in applications that cause frequent BWP switching, for example, switching between a FD slot and a HD slot that may have different frequencies, bandwidths, and/or slot formats.

Figure 13:
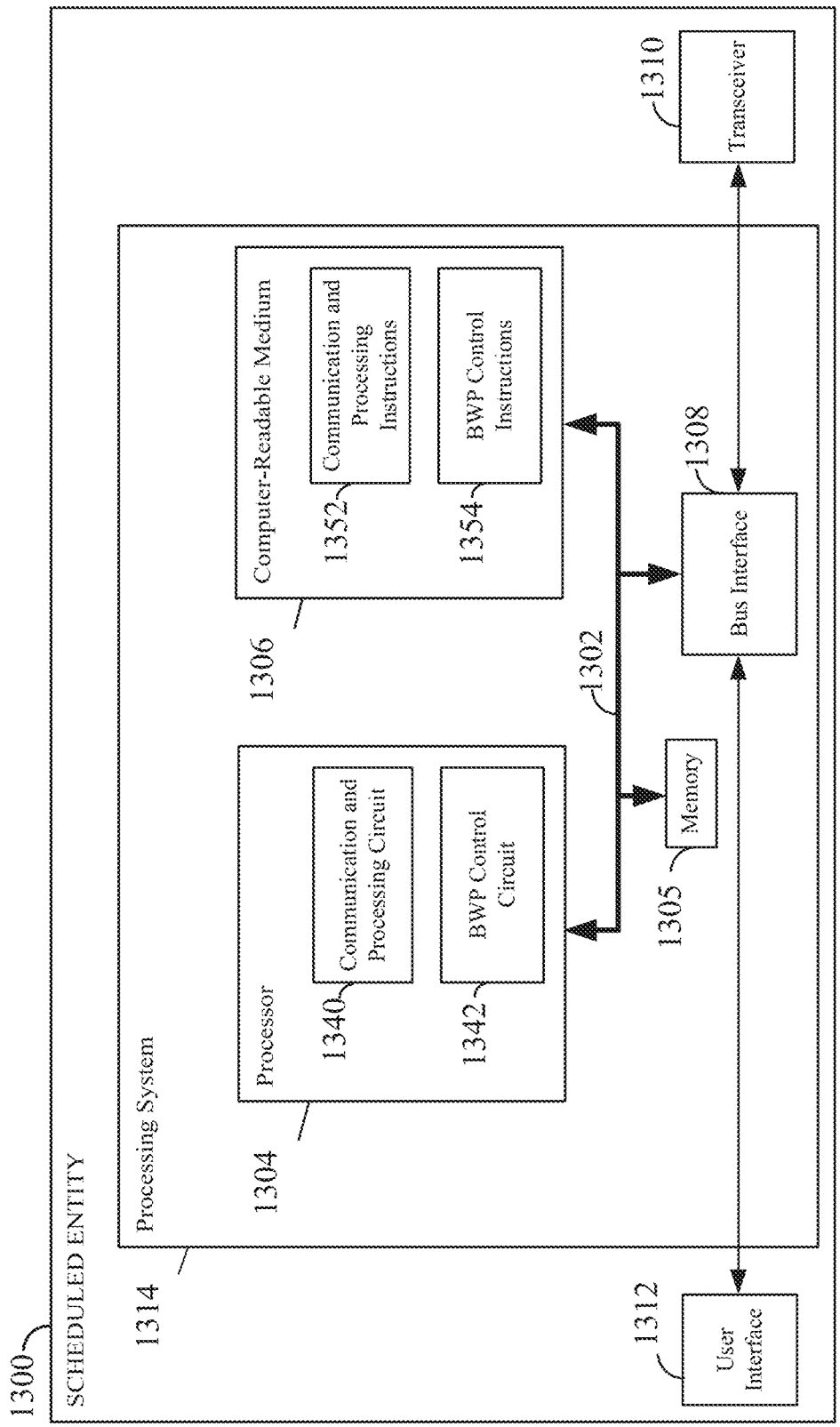
FIG. 13 is a block diagram conceptually illustrating an example of a hardware implementation for a scheduled entity according to some aspects of the disclosure.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1, 2, 7, and/or 9.

The processing system 1314 may be substantially the same as the processing system 1114 illustrated in FIG. 11, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 11. That is, the processor 1304, as utilized in a scheduled entity 1300, may be used to implement any one or more of the processes described and illustrated in FIG. 14.

In some aspects of the disclosure, the processor 1304 may include circuitry configured for various functions, including, for example, wireless communication with a scheduling entity using an active BWP and a complementary BWP. For example, the circuitry may be configured to implement one or more of the functions described in relation to FIGS. 6-10 and 14.

In some aspects of the disclosure, the processor 1304 may include communication and processing circuitry 1340 configured for various functions, including for example communicating with a scheduling entity. In some examples, the communication and processing circuitry 1340 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1340 may include one or more transmit/receive chains. In addition, the communication and processing circuitry 1340 may be configured to process and transmit uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1340 may further be configured to execute communication and processing software 1352 stored on the computer-readable medium 1306 to implement one or more functions described herein.

In some implementations where the communication involves receiving information, the communication and processing circuitry 1340 may obtain information from a component of the wireless communication device 1300 (e.g., from the transceiver 1310 that receives the information via radio frequency signaling or some other type of signaling suitable for the applicable communication medium), process (e.g., decode) the information, and output the processed information. For example, the communication and processing circuitry 1340 may output the information to another component of the processor 1304, to the memory 1305, or to the bus interface 1308. In some examples, the communication and processing circuit 1340 may receive one or more of signals, messages, other information, or any combination thereof. In some examples, the communication and processing circuitry 1340 may receive information via one or more channels. In some examples, the communication and processing circuitry 1340 may include functionality for a means for receiving. In some examples, the communication and processing circuitry 1340 may include functionality for a means for processing, including a means for demodulating, a means for decoding, etc.

In some implementations where the communication involves sending (e.g., transmitting) information, the communication and processing circuitry 1340 may obtain information (e.g., from another component of the processor 1304, the memory 1305, or the bus interface 1308), process (e.g., modulate, encode, etc.) the information, and output the processed information. For example, the communication and processing circuitry 1340 may output the information to the transceiver 1310 (e.g., that transmits the information via radio frequency signaling or some other type of signaling suitable for the applicable communication medium). In some examples, the communication and processing circuitry

1340 may send one or more of signals, messages, other information, or any combination thereof. In some examples, the communication and processing circuitry 1340 may send information via one or more channels. In some examples, the communication and processing circuitry 1340 may include functionality for a means for sending (e.g., a means for transmitting). In some examples, the communication and processing circuitry 1340 may include functionality for a means for generating, including a means for modulating, a means for encoding, etc.

In some aspects, the processor 1304 may include a BWP control circuit 1342 that can be configured to perform various functions for configuring, selecting, and controlling BWP used in wireless communication with a scheduling entity. For example, the BWP control circuit 1342 can configure an anchor BWP and a complementary BWP for UL and DL communication based on the capability of the scheduled entity to use a complementary BWP for wireless communication. In some examples, the BWP control circuit 1342 may transmit UE capability information that indicates whether the scheduled entity can support one or more complementary BWPs. The BWP control circuitry 1342 may further be configured to execute BWP control software 1354 stored on the computer-readable medium 1306 to implement one or more functions described herein.

Figure 14:
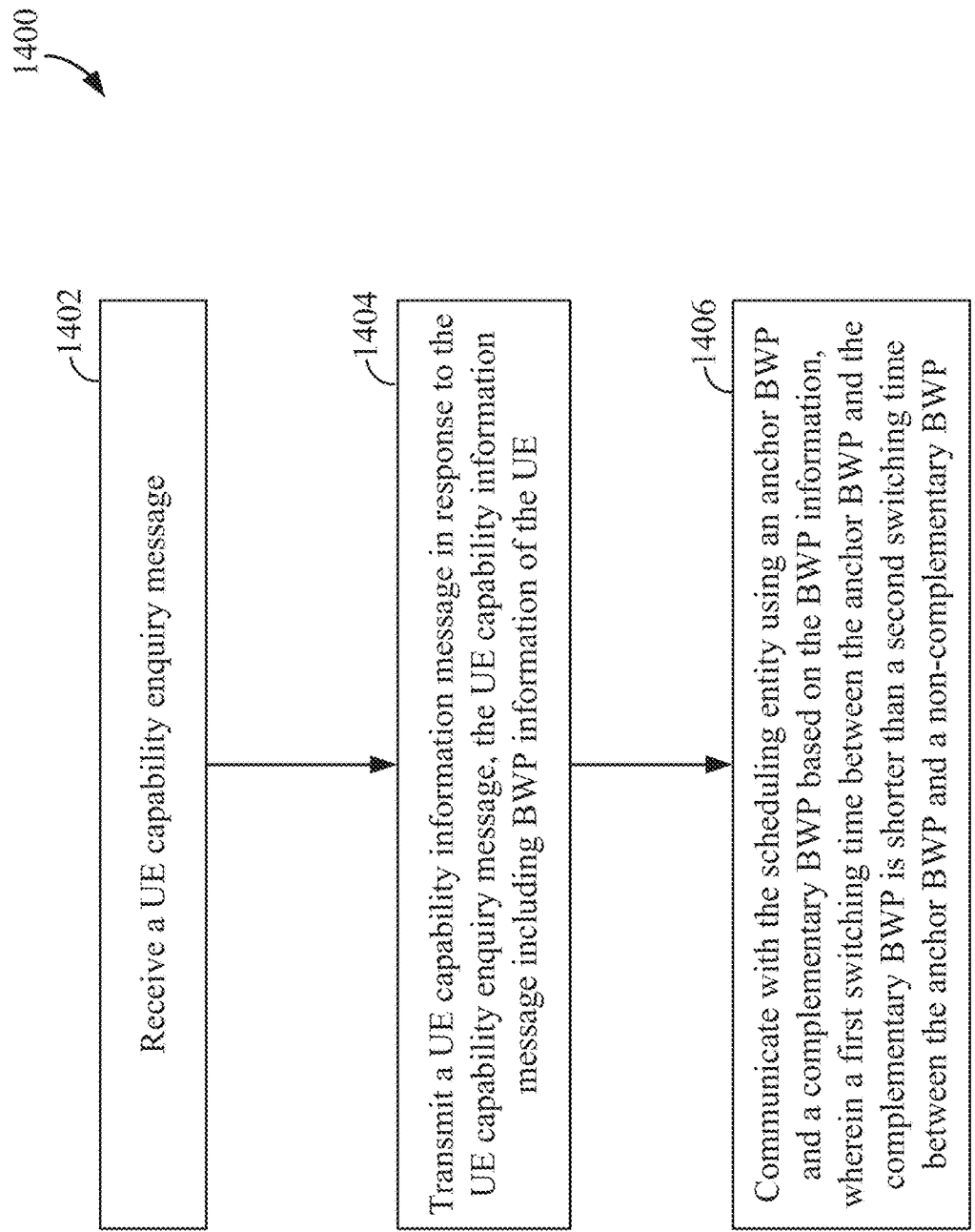
FIG. 14 is a flow chart illustrating an exemplary process for wireless communication at a user equipment using UE capability information with complementary BWP support according to some aspects of the disclosure.

FIG. 14 is a flow chart illustrating an exemplary process 1400 for wireless communication at a scheduled entity with support for using a complementary bandwidth part (BWP) to communicate with a scheduling entity in accordance with some aspects of the present disclosure. As described below, some or all illustrated features may be omitted in a particular implementation within the scope of the present disclosure, and some illustrated features may not be required for the implementation of all examples. In some examples, the process 1400 may be carried out by the scheduled entity 1300 illustrated in FIG. 14. In some examples, the process 1400 may be carried out by any suitable apparatus (e.g., UE) or means for carrying out the functions or algorithm described below.

At block 1402, the scheduled entity can receive a UE capability enquiry message from a network (e.g., a scheduling entity or gNB). In some aspects, the communication and processing circuit 1340 may provide a means to receive the UE capability enquiry message 706 via the transceiver 1310. In one example, the scheduled entity may receive the UE capability enquiry message in an RRC message from the scheduling entity. The UE capability enquiry message may specify the UE-specific capability information, for example supplemental BWP support, requested by the network.

At block 1404, the scheduled entity can transmit a UE capability information message in response to the UE capability inquiry message. For example, the BWP control circuit 1342 may provide a means to generate and transmit the UE capability information message that may include information on UE capability, for example, supported BWPs and complementary BWPs, if any. The UE capability information message may include information on BWPs that can be configured or supported by the scheduled entity, for example, complementary BWP information. In some aspects, the communication and processing circuit 1340 may provide a means to transmit the UE capability information message via the transceiver 1310. In one example, the scheduled entity may transmit the UE capability information message 708 in an RRC message.

At block 1406, the scheduled entity can communicate with the scheduling entity (e.g., gNB) using an anchor BWP and a complementary BWP based on the BWP information.

In some aspects, the communication and processing circuit 1340 may provide a means to communicate with the scheduling entity using the anchor BWP and the complementary BWP. Using the UE capability information to signal support of complementary BWP enables the network to schedule faster BWP switching using the complementary BWP when it is available or supported at the UE. For example, the use of the complementary BWP can be helpful in applications that generate frequent BWP switching, for example, switching between a FD slot and a HD slot that may have different frequencies, bandwidths, and/or slot formats.

In a first aspect, a user equipment (UE) for wireless communication is provided. The UE includes: a communication interface configured to communicate with a scheduling entity; a memory; and a processor operatively coupled with the communication interface and the memory, wherein the processor and the memory are configured to: receive, from the scheduling entity, a UE capability enquiry message; transmit, to the scheduling entity, a UE capability information message in response to the UE capability enquiry message, the UE capability information message comprising bandwidth part (BWP) information of the UE; and communicate with the scheduling entity using an anchor BWP and a complementary BWP based on the BWP information, wherein a first switching time between the anchor BWP and the complementary BWP is shorter than a second switching time between the anchor BWP and a non-complementary BWP.

In a second aspect, alone or in combination with the first aspect, wherein the BWP information indicates at least one of: the UE is incapable of using the complementary BWP; the UE is capable of using the complementary BWP with a predetermined constraint; or the UE is capable to using the complementary BWP without constraint.

In a third aspect, alone or in combination with the second aspect, wherein the predetermined constraint comprises at least one of: a bandwidth constraint of the complementary BWP; a frequency allocation constraint of the complementary BWP; or a network configuration constraint of the complementary BWP.

In a fourth aspect, alone or in combination with any of the first to third aspects, wherein the processor and the memory are further configured to: receive, from the scheduling entity, a BWP configuration message that indicates the complementary BWP; in response to determining that the indicated complementary BWP is inconsistent with a capability of the UE, at least one of: communicate with the scheduling entity using the anchor BWP without using the complementary BWP; or identify one or more configured BWPs that are suitable to be configured as a complementary BWP for communication with the scheduling entity.

In a fifth aspect, alone or in combination with any of the first to third aspects, wherein the processor and the memory are further configured to: receive, from the scheduling entity, a BWP configuration message that configures the anchor BWP without a complementary BWP configuration; select the complementary BWP of the anchor BWP based a predetermined rule; and communicate with the scheduling entity using the anchor BWP and the selected complementary BWP.

In a sixth aspect, alone or in combination with the fifth aspect, wherein the predetermined rule comprises at least one of: selecting the complementary BWP based on a BWP ID; selecting the complementary BWP based on a BWP bandwidth; selecting the complementary BWP based on a power saving of the complementary BWP; selecting the complementary BWP based on a UE processing load of the complementary BWP; selecting the complementary BWP based on a bandwidth of the anchor BWP; or selecting the complementary BWP based on a frequency allocation of the anchor BWP.

In a seventh aspect, alone or in combination with any of the first to sixth aspects, wherein the processor and the memory are further configured to: switch between the anchor BWP and the complementary BWP based on a predetermined condition without receiving a BWP switching command from the scheduling entity, wherein the predetermined condition comprises at least one of: a slot format of communication between the UE and the scheduling entity; or a priority of communication between the UE and the scheduling entity.

In an eighth aspect, a method of wireless communication at a user equipment (UE) is provided. The method comprises: receiving, from a scheduling entity, a UE capability enquiry message; transmitting, to the scheduling entity, a UE capability information message in response to the UE capability enquiry message, the UE capability information message comprising bandwidth part (BWP) information of the UE; and communicating with the scheduling entity using an anchor BWP and a complementary BWP based on the BWP information, wherein a first switching time between the anchor BWP and the complementary BWP is shorter than a second switching time between the anchor BWP and a non-complementary BWP.

In a ninth aspect, alone or in combination with the eighth aspect, wherein the BWP information indicates at least one of: the UE is incapable of using the complementary BWP; the UE is capable of using the complementary BWP with a predetermined constraint; or the UE is capable to using the complementary BWP without constraint.

In a tenth aspect, alone or in combination with the ninth aspect, wherein the predetermined constraint comprises at least one of: a bandwidth constraint of the complementary BWP; a frequency allocation constraint of the complementary BWP; or a network configuration constraint of the complementary BWP.

In an eleventh aspect, alone or in combination with any of the eighth to tenth aspects, the method further comprises: receiving, from the scheduling entity, a BWP configuration message that indicates the complementary BWP; in response to determining that the indicated complementary BWP is inconsistent with a capability of the UE, at least one of: communicating with the scheduling entity using the anchor BWP without using the complementary BWP; or identifying one or more configured BWPs that are suitable to be configured as a complementary BWP for communication with the scheduling entity.

In a twelfth aspect, alone or in combination with any of the eighth to tenth aspects, the method further comprises: receiving, from the scheduling entity, a BWP configuration message that configures the anchor BWP without a complementary BWP configuration; selecting the complementary BWP of the anchor BWP based a predetermined rule; and communicating with the scheduling entity using the anchor BWP and the selected complementary BWP.

In a thirteenth aspect, alone or in combination with the twelfth aspect, wherein the predetermined rule comprises at least one of: selecting the complementary BWP based on a BWP ID; selecting the complementary BWP based on a BWP bandwidth; selecting the complementary BWP based on a power saving of the complementary BWP; selecting the complementary BWP based on a UE processing load of the complementary BWP; selecting the complementary BWP based on a bandwidth of the anchor BWP; or selecting the complementary BWP based on a frequency allocation of the anchor BWP.

In a fourteenth aspect, alone or in combination with any of the eighth to thirteenth aspects, the method further comprises: switching between the anchor BWP and the complementary BWP based on a predetermined condition without receiving a BWP switching command from the scheduling entity, wherein the predetermined condition comprises at least one of: a slot format of communication between the UE and the scheduling entity; or a priority of communication between the UE and the scheduling entity.

In a fifteenth aspect, a scheduling entity for wireless communication is provided. The scheduling entity comprises: a transceiver configured to communicate with a user equipment (UE); a memory; and a processor operatively coupled with the transceiver and the memory. The processor and the memory are configured to transmit a UE capability enquiry message to the UE. The processor and the memory are configured to receive a UE capability information message from the UE. The UE capability information message comprises bandwidth part (BWP) information that indicates a capability of the UE to utilize an anchor BWP and a complementary BWP to communicate with the scheduling entity. A first switching time between the anchor BWP and the complementary BWP is shorter than a second switching time between the anchor BWP and a non-complementary BWP. The processor and the memory are further configured to communicate with the UE using the anchor BWP and the complementary BWP based on the BWP information.

In a sixteenth aspect, alone or in combination with the fifteenth aspect, wherein the BWP information indicates at least one of: the UE is incapable of using the complementary BWP; the UE is capable of using the complementary BWP with a predetermined constraint; or the UE is capable of using the complementary BWP without constraint.

In a seventeenth aspect, alone or in combination with the sixteenth aspect, wherein the predetermined constraint comprises at least one of: a bandwidth constraint of the complementary BWP; a frequency allocation constraint of the complementary BWP; or a network configuration constraint of the complementary BWP.

In an eighteenth aspect, alone or in combination with any of the fifteenth to seventeenth aspects, wherein the processor and the memory are further configured to: transmit, to the UE, a BWP configuration message that indicates the complementary BWP, wherein the indicated complementary BWP is inconsistent with a capability of the UE; and communicate with the UE using the anchor BWP without using the complementary BWP.

In a ninth aspect, alone or in combination with any of the fifteenth to seventeenth aspects, wherein the processor and the memory are further configured to: transmit, to the UE, a BWP configuration message that indicates the complementary BWP, wherein the indicated complementary BWP is inconsistent with a capability of the UE; and communicate with the UE using the anchor BWP and a different complementary BWP not indicated by the BWP configuration message.

In a twentieth aspect, alone or in combination with any of the fifteenth to seventeenth aspects, wherein the processor and the memory are further configured to: transmit, to the UE, a BWP configuration message that configures the anchor BWP without a complementary BWP configuration; and communicate with the UE using the anchor BWP without configuring the complementary BWP.

In a twenty-first aspect, alone or in combination with any of the fifteenth to twentieth aspects, wherein the processor and the memory are further configured to: switch between the anchor BWP and the complementary BWP based on a predetermined condition without transmitting a BWP switching command to the UE.

In a twenty-second aspect, alone or in combination with the twenty-first aspect, wherein the predetermined condition comprises at least one of: a slot format of traffic between the UE and the scheduling entity; or a priority of traffic between the UE and the scheduling entity.

In a twenty-third aspect, a method of wireless communication at a scheduling entity is provided. The method comprises transmitting a UE capability enquiry message, to a user equipment (UE). The method comprises receiving a UE capability information message from the UE. UE The capability information message comprises bandwidth part (BWP) information that indicates a capability of the UE to utilize an anchor BWP and a complementary BWP to communicate with the scheduling entity. A first switching time between the anchor BWP and the complementary BWP is shorter than a second switching time between the anchor BWP and a non-complementary BWP. The method further comprises communicating with the UE using the anchor BWP and the complementary BWP based on the BWP information.

In a twenty-fourth aspect, alone or in combination with the twenty-third aspect, wherein the BWP information indicates at least one of: the UE is incapable of using the complementary BWP; the UE is capable of using the complementary BWP with a predetermined constraint; or the UE is capable of using the complementary BWP without constraint.

In a twenty-fifth aspect, alone or in combination with the twenty-fourth aspect, wherein the predetermined constraint comprises at least one of: a bandwidth constraint of the complementary BWP; a frequency allocation constraint of the complementary BWP; or a network configuration constraint of the complementary BWP.

In a twenty-sixth aspect, alone or in combination with any of the twenty-third to twenty-fifth aspects, the method further comprises: transmitting, to the UE, a BWP configuration message that indicates the complementary BWP, wherein the indicated complementary BWP is inconsistent with a capability of the UE; and communicating with the UE using the anchor BWP without using the complementary BWP.

In a twenty-seventh aspect, alone or in combination with any of the twenty-third to twenty-fifth aspects, the method further comprises: transmitting, to the UE, a BWP configuration message that indicates the complementary BWP, wherein the indicated complementary BWP is inconsistent with a capability of the UE; and communicating with the UE using the anchor BWP and a different complementary BWP not indicated by the BWP configuration message.

In a twenty-eighth aspect, alone or in combination with any of the twenty-third to twenty-fifth aspects, the method further comprises: transmitting, to the UE, a BWP configuration message that configures the anchor BWP without a complementary BWP configuration; and communicating with the UE using the anchor BWP without configuring the complementary BWP.

In a twenty-ninth aspect, alone or in combination with any of the twenty-third to twenty-eighth aspects, the method further comprises: switching between the anchor BWP and the complementary BWP based on a predetermined condition without transmitting a BWP switching command to the UE.

In a thirtieth aspect, alone or in combination with the twenty-ninth aspect, wherein the predetermined condition comprises at least one of: a slot format of traffic between the UE and the scheduling entity; or a priority of traffic between the UE and the scheduling entity.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
    a communication interface configured to communicate with a scheduling entity;
    a memory; and
    one or more processors coupled with the communication interface and the memory,
    the one or more processors being configured to:
        receive, from the scheduling entity, a UE capability enquiry message;
        transmit, to the scheduling entity, a UE capability information message in response to the UE capability enquiry message, the UE capability information message comprising bandwidth part (BWP) information of the UE, the BWP information indicating that the UE is capable of using a complementary BWP with a predetermined constraint; and
        communicate with the scheduling entity using an anchor BWP and the complementary BWP based on the BWP information,
        wherein a first switching time between the anchor BWP and the complementary BWP is shorter than a second switching time between the anchor BWP and a non-complementary BWP.

2. The UE of claim 1, wherein the predetermined constraint comprises at least one of:
    a bandwidth constraint of the complementary BWP;
    a frequency allocation constraint of the complementary BWP; or
    a network configuration constraint of the complementary BWP.

3. The UE of claim 1, wherein the one or more processors are further configured to:
    receive, from the scheduling entity, a BWP configuration message that indicates the complementary BWP;
    in response to determining that the indicated complementary BWP is inconsistent with a capability of the UE, at least one of:
        communicate with the scheduling entity using the anchor BWP without using the complementary BWP; or
        identify one or more configured BWPs that are suitable to be configured as the complementary BWP for communication with the scheduling entity.

4. The UE of claim 1, wherein the one or more processors are further configured to:
    receive, from the scheduling entity, a BWP configuration message that configures the anchor BWP without a complementary BWP configuration;
    select the complementary BWP of the anchor BWP based a predetermined rule; and
    communicate with the scheduling entity using the anchor BWP and the selected complementary BWP.

5. The UE of claim 4, wherein the predetermined rule comprises at least one of:
    selecting the complementary BWP based on a BWP ID;
    selecting the complementary BWP based on a BWP bandwidth;
    selecting the complementary BWP based on a power saving of the complementary BWP;
    selecting the complementary BWP based on a UE processing load of the complementary BWP;
    selecting the complementary BWP based on a bandwidth of the anchor BWP; or
    selecting the complementary BWP based on a frequency allocation of the anchor BWP.

6. The UE of claim 1, wherein the one or more processors are further configured to:
    switch between the anchor BWP and the complementary BWP based on a predetermined condition without receiving a BWP switching command from the scheduling entity,
    wherein the predetermined condition comprises at least one of:
        a slot format of communication between the UE and the scheduling entity; or
        a priority of communication between the UE and the scheduling entity.

7. A method of wireless communication at a user equipment (UE), comprising:
    receiving, from a scheduling entity, a UE capability enquiry message;
    transmitting, to the scheduling entity, a UE capability information message in response to the UE capability enquiry message, the UE capability information message comprising bandwidth part (BWP) information of the UE, the BWP information indicating that the UE is capable of using a complementary BWP with a predetermined constraint; and
    communicating with the scheduling entity using an anchor BWP and the complementary BWP based on the BWP information,
    a first switching time between the anchor BWP and the complementary BWP being shorter than a second switching time between the anchor BWP and a non-complementary BWP.

8. The method of claim 7, wherein the predetermined constraint comprises at least one of:
    a bandwidth constraint of the complementary BWP;

a frequency allocation constraint of the complementary BWP; or a network configuration constraint of the complementary BWP.

9. The method of claim 7, further comprising:

receiving, from the scheduling entity, a BWP configuration message that indicates the complementary BWP;

in response to determining that the indicated complementary BWP is inconsistent with a capability of the UE, at least one of:

communicating with the scheduling entity using the anchor BWP without using the complementary BWP; or identifying one or more configured BWPs that are suitable to be configured as the complementary BWP for communication with the scheduling entity.

10. The method of claim 7, further comprising:

receiving, from the scheduling entity, a BWP configuration message that configures the anchor BWP without a complementary BWP configuration;

selecting the complementary BWP of the anchor BWP based a predetermined rule; and communicating with the scheduling entity using the anchor BWP and the selected complementary BWP.

11. The method of claim 10, wherein the predetermined rule comprises at least one of:

selecting the complementary BWP based on a BWP ID;

selecting the complementary BWP based on a BWP bandwidth;

selecting the complementary BWP based on a power saving of the complementary BWP;

selecting the complementary BWP based on a UE processing load of the complementary BWP;

selecting the complementary BWP based on a bandwidth of the anchor BWP; or selecting the complementary BWP based on a frequency allocation of the anchor BWP.

12. The method of claim 7, further comprising:

switching between the anchor BWP and the complementary BWP based on a predetermined condition without receiving a BWP switching command from the scheduling entity, wherein the predetermined condition comprises at least one of:

a slot format of communication between the UE and the scheduling entity; or a priority of communication between the UE and the scheduling entity.

13. A scheduling entity for wireless communication, comprising:

a transceiver configured to communicate with a user equipment (UE);

a memory; and one or more processors coupled with the transceiver and the memory, the one or more processors being configured to:

transmit, to the UE, a UE capability enquiry message;

receive, from the UE, a UE capability information message comprising bandwidth part (BWP) information that indicates a capability of the UE to utilize an anchor BWP and a complementary BWP to communicate with the scheduling entity, the BWP information indicating that the UE is capable of using the complementary BWP with a predetermined constraint, wherein a first switching time between the anchor BWP and the complementary BWP is shorter than a second switching time between the anchor BWP and a non-complementary BWP; and communicate with the UE using the anchor BWP and the complementary BWP based on the BWP information.

14. The scheduling entity of claim 13, wherein the predetermined constraint comprises at least one of:

a bandwidth constraint of the complementary BWP;

a frequency allocation constraint of the complementary BWP; or a network configuration constraint of the complementary BWP.

15. The scheduling entity of claim 13, wherein the one or more processors are further configured to:

transmit, to the UE, a BWP configuration message that indicates the complementary BWP, wherein the indicated complementary BWP is inconsistent with a capability of the UE; and communicate with the UE using the anchor BWP without using the complementary BWP.

16. The scheduling entity of claim 13, wherein the one or more processors are further configured to:

transmit, to the UE, a BWP configuration message that indicates the complementary BWP, wherein the indicated complementary BWP is inconsistent with a capability of the UE; and communicate with the UE using the anchor BWP and a different complementary BWP not indicated by the BWP configuration message.

17. The scheduling entity of claim 13, wherein the one or more processors are further configured to:

transmit, to the UE, a BWP configuration message that configures the anchor BWP without a complementary BWP configuration; and communicate with the UE using the anchor BWP without configuring the complementary BWP.

18. The scheduling entity of claim 13, wherein the one or more processors are further configured to:

switch between the anchor BWP and the complementary BWP based on a predetermined condition without transmitting a BWP switching command to the UE.

19. The scheduling entity of claim 18, wherein the predetermined condition comprises at least one of:

a slot format of traffic between the UE and the scheduling entity; or a priority of traffic between the UE and the scheduling entity.

20. A method of wireless communication at a scheduling entity, comprising:

transmitting, to a user equipment (UE), a UE capability enquiry message;

receiving, from the UE, a UE capability information message comprising bandwidth part (BWP) information that indicates a capability of the UE to utilize an anchor BWP and a complementary BWP to communicate with the scheduling entity, the BWP information indicating that the UE is capable of using the complementary BWP with a predetermined constraint, wherein a first switching time between the anchor BWP and the complementary BWP is shorter than a second switching time between the anchor BWP and a non-complementary BWP; and communicating with the UE using the anchor BWP and the complementary BWP based on the BWP information.

21. The method of claim 20, wherein the predetermined constraint comprises at least one of:

a bandwidth constraint of the complementary BWP;
a frequency allocation constraint of the complementary BWP; or
a network configuration constraint of the complementary BWP.

22. The method of claim 20, further comprising:
transmitting, to the UE, a BWP configuration message that indicates the complementary BWP, wherein the indicated complementary BWP is inconsistent with a capability of the UE; and
communicating with the UE using the anchor BWP without using the complementary BWP.

23. The method of claim 20, further comprising:
transmitting, to the UE, a BWP configuration message that indicates the complementary BWP, wherein the indicated complementary BWP is inconsistent with a capability of the UE; and
communicating with the UE using the anchor BWP and a different complementary BWP not indicated by the BWP configuration message.

24. The method of claim 20, further comprising:
transmitting, to the UE, a BWP configuration message that configures the anchor BWP without a complementary BWP configuration; and
communicating with the UE using the anchor BWP without configuring the complementary BWP.

25. The method of claim 20, further comprising:
switching between the anchor BWP and the complementary BWP based on a predetermined condition without transmitting a BWP switching command to the UE.

26. The method of claim 25, wherein the predetermined condition comprises at least one of:
a slot format of traffic between the UE and the scheduling entity; or
a priority of traffic between the UE and the scheduling entity.

* * * * *